Nov. 1, 1966

G. D. HAYNIE 3,283,254

CONTROL SYSTEM EMPLOYING COUNTER TO GENERATE SIGNALS FOR
CHANGING OUTPUT, LINEARLY OR NON-LINEARLY, OF
FREQUENCY SYNTHESIZER

Filed Dec. 6, 1963

INVENTOR
G. D. HAYNIE
BY
G. E. Hirsch Jr.
ATTORNEY

Nov. 1, 1966 G. D. HAYNIE 3,283,254
CONTROL SYSTEM EMPLOYING COUNTER TO GENERATE SIGNALS FOR
CHANGING OUTPUT, LINEARLY OR NON-LINEARLY, OF
FREQUENCY SYNTHESIZER
Filed Dec. 6, 1963 3 Sheets-Sheet 3

United States Patent Office 3,283,254
Patented Nov. 1, 1966

3,283,254
CONTROL SYSTEM EMPLOYING COUNTER TO GENERATE SIGNALS FOR CHANGING OUTPUT, LINEARLY OR NON-LINEARLY, OF FREQUENCY SYNTHESIZER
Gerald D. Haynie, Berkeley Heights, N.J., assignor to Bell Telephone Laboratories, Incorporated, New York, N. Y., a corporation of New York
Filed Dec. 6, 1963, Ser. No. 328,682
17 Claims. (Cl. 328—71)

This invention pertains to the generation of electric waves of different frequencies and, more particularly, to the generation of electric waves whose frequencies vary in time according to a prescribed schedule. It finds use, therefore, in the class of devices known as "sweep frequency" generators.

The precise measurement of transmission parameters such as gain and phase as a function of frequency is a prerequisite to the complete analysis of a communication system. Common procedure is to energize a system or network with the signals of a sweep frequency generator and record or otherwise display the response of the system as the input frequency is varied. Problems arise, however, when it is required that the system's response, as indicated by the recording, be accurately correlated with the input frequency. A number of attempts at solving this problem have been made.

In some cases the recorder has been mechanically or electrically coupled to the sweep generator. This technique lacks sufficient accuracy, however, for precise measurements. Another technique has been to calibrate graph paper for a specific oscillator used. Though this method may be accurate, it is extremely wasteful of time and dependent wholly on the stability of the oscillator calibrated. Still, another technique has been to use frequency markers and interpolate between them. Such interpolation is quite difficult when the output signal frequency, for example, is an exponential function of time.

The most accurate, but, at the same time the most difficult solution is to construct an oscillator with a precise signal frequency output such that the recorder might be independently driven at a uniform rate thus permitting partition of the time scale into accurate frequency divisions. Sweep generators have been constructed which attempt this solution by using oscillators which are controlled by motor driven, shaped capacitors. At best, these oscillators have an accuracy of a few percent.

It is the principal object of this invention to improve the art of precision frequency control of a variable frequency signal.

Another object is to attain an accuracy several magnitudes greater than that found in previous sweep frequency generators.

Another object is to provide a precise sweep frequency generator whose output signal frequency is a linear function of time.

Yet another object is to provide a precise sweep frequency generator whose output signal frequency is an exponential function of time.

These objects are accomplished in accordance with the present invention, by developing a continuous sequence of control signals, according to a prescribed program, which are utilized correspondingly to alter the signal output of frequency synthesizing apparatus. A counter, capable of generating electrical signals indicative of a specified numerical quantity, performs this control function. The counter, when activated by a fixed frequency oscillator, produces a sequence of signals which linearly alter the signal frequency output of a frequency synthesizer. If, instead, the counter is activated by the signal output of the synthesizer, a sequence of control signals is generated which alters, in an exponential fashion, the signal frequency output of the synthesizer. Frequency synthesizers, well known for their high degree of accuracy, are readily available. Normally actuated by switches, push buttons, etc., some are responsive to electrical control signals. They are essentially variable frequency generators which perform operations on the signal harmonics of internal standard frequency sources to develop a desired frequency.

By practice of this invention, the control signals which determine the output frequency of the synthesizer are functionally related so as to generate output signal frequencies that are either a linear or exponential function of time. To provide this proper sequence of control signals, a counter is used as the controlling source. Each decade of the counter is connected to the appropriate decade control panel of the synthesizer. As a decade unit of the counter is pulsed, it not only registers a number corresponding to the number of pulses received, but also transmits corresponding control signals to the synthesizer. The synthesizer output frequency changes accordingly, to correspond with the number registered by the counter.

To generate a linear sweep, the counter is pulsed by a stable signal source of constant frequency. Each input pulse to the counter increases the registered count by a specified numerical quantity consequently increasing the output frequency of the synthesizer in a like manner. The resulting output frequency is a highly precise and linear function of frequency.

The generation of an exponential sweep is accomplished by employing as the energizing input, instead of the stable signal source, a feedback loop from the output of the synthesizer. As to be more fully described hereinafter, the practice of the present invention in this fashion necessarily requires that the rate of change of the output frequency is a linear function of the output frequency. This functional relationship inexorably ensures that the output frequency is an exponential function of time.

These and further features and objects of this invention, its nature and various advantages, will appear more fully upon consideration of the attached drawings and of the following detailed description of the drawings.

Figure 1:
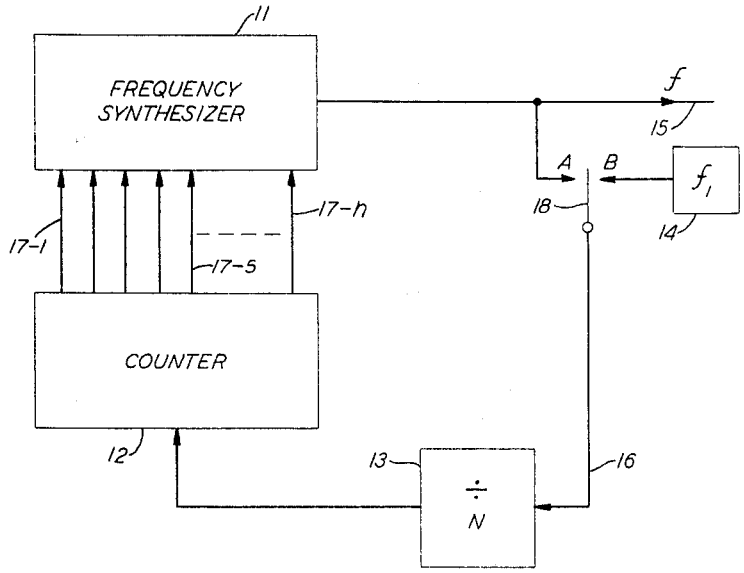
FIG. 1 is a schematic block diagram illustrating the mode of operation of the invention.

FIG. 1 shows a signal source 14 whose frequency $f_1$ is precisely controlled, e.g., by a crystal, which by switch 18 may either be connected to divider network 13 or disconnected entirely from the circuit. Assuming that switch 18 is in position B, source 14 will transmit signals of frequency $f_1$ to divider 13 via line 16. The divider 13, e.g., a cascade of binary multivibrators, produces one signal pulse for each N cycles of frequency $f_1$. These output pulses of divider 13 are transmitted to counter 12 which, in a well-known fashion, registers the number of pulses received from divider 13. Each decade of the counter has an output bus, 17–1 . . . 17–$n$, which is connected to one energizing terminal of frequency synthesizer 11. As different numbers are registered by the counter, signals are transmitted to the synthesizer which responds with a signal output, at line 15, of a frequency corresponding to the registered count. Thus, if each pulse increases the registered count by K, and network 13 has a divisor factor N, at time T the frequency will have changed from that at time $T_0$ by $$\frac{Kf_1}{N}(T-T_0)$$

In addition, if at $T_0$ the output frequency is $f_0$ then the output frequency $f$ at any time later will be given by the equation:

$$f = f_0 + \frac{Kf_1}{N}(T-T_0) \qquad (1)$$

Figure 4:
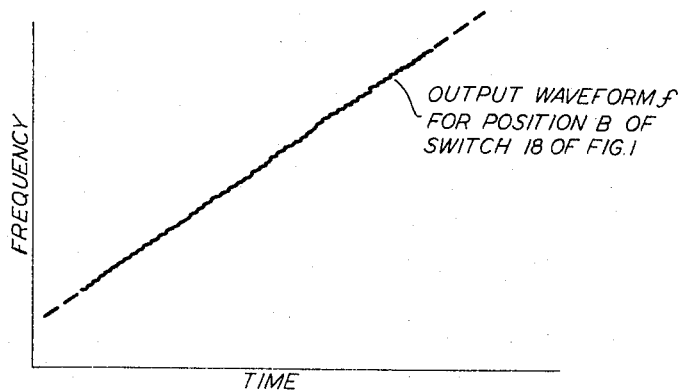
FIG. 4 is a graphical presentation of the linear output signal frequency characteristic of the apparatus of the present invention as a function of time.

The output on line 15 is thus a signal whose frequency changes linearly as a function of time as depicted in the graphical presentation of FIG. 4.

If, however, switch 18 is in position A, the following operation will ensue. Assuming that counter 12 has been set to some arbitrary number $f_0$, then the output frequency of synthesizer 11 at time $T_0$ will be $f_0$. After N cycles of frequency $f_0$, counter 12 will be pulsed by divider 13 increasing the count registered on the counter by a factor K. Accordingly, the output frequency $f$ will be increased by K which therefore changes the time rate of pulses into divider 13 and thus the rate of change of the count registered by counter 12. Since the frequency of the synthesizer output corresponds to the count registered, the output frequency $f$ is changing at a rate $Kf/N$, expressed mathematically by the differential equation:

$$\frac{df}{dT} = \frac{K}{N}f \qquad (2)$$

The solution of this equation is straightforward and results in the exponential function $$f = f_0 \epsilon^{\frac{K}{N}(T-T_0)} \qquad (3)$$

Figure 5:
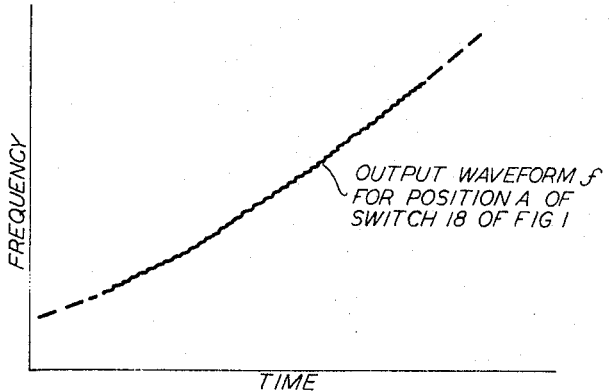
FIG. 5 is a graphical presentation of the exponential output signal frequency characteristic of the apparatus of the present invention as a function of time.

The output signal on line 15 is accordingly one whose frequency changes exponentially as a function of time as depicted in the graphical presentation of FIG. 5.

Thus, by the practice of this invention, either a precise linear or exponential sweep frequency signal is generated utilizing logic control of frequency synthesizing apparatus without the inherent limitations of motor driven, capacitive controlled oscillators or other disadvantages of the prior art. In addition, the generated sweep signal, as more fully described hereinafter, may be either automatically or manually recycled.

Figure 2:
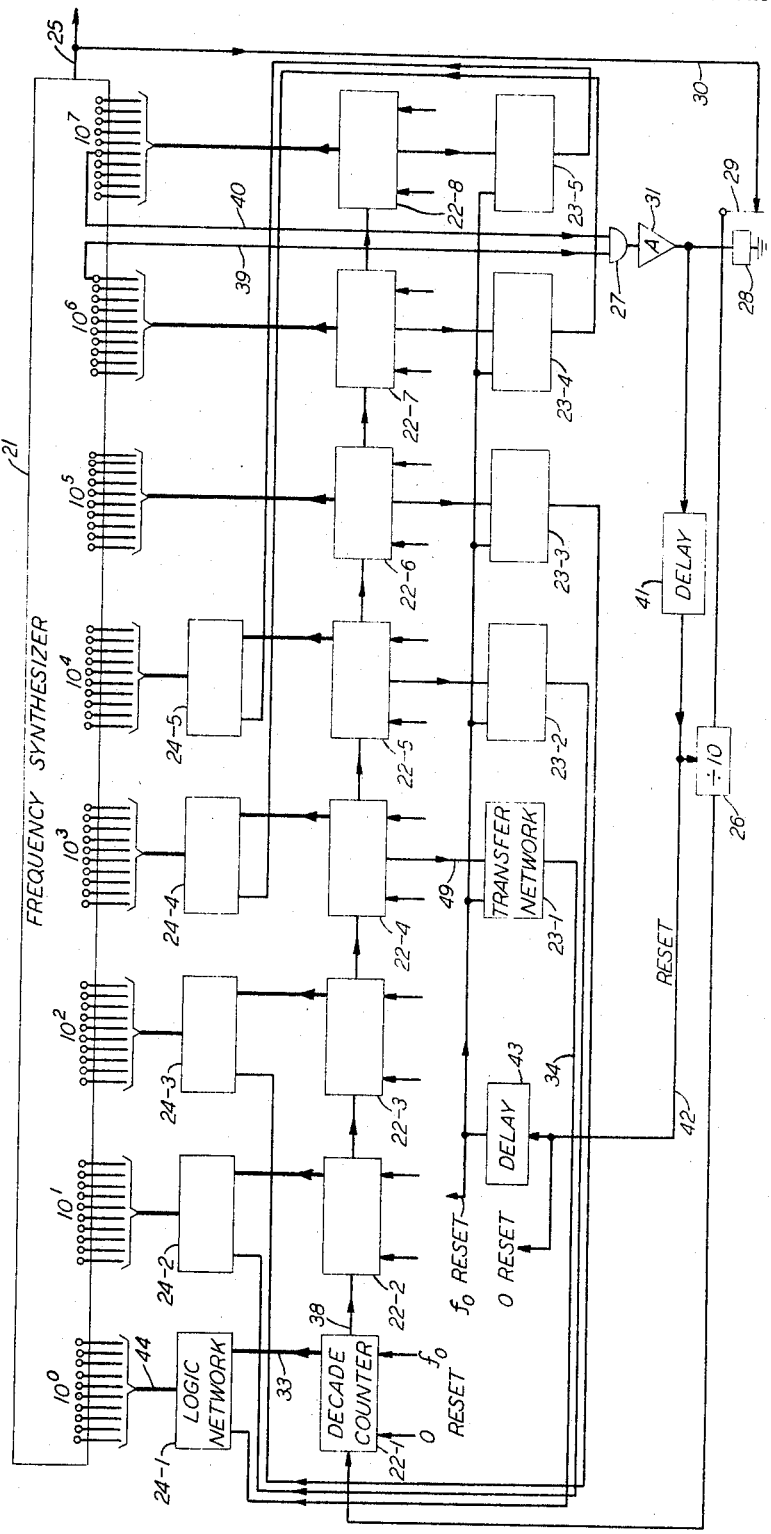
FIG. 2 is a schematic block diagram of a preferred embodiment of the invention.

FIG. 2 illustrates a detailed representation of one typical embodiment of this invention. Frequency synthesizer 21 may be any synthesizer which is responsive to control signals. One of such synthesizers commercially available is the "Model 5100A–5110A Frequency Synthesizer" manufactured by the Hewlett Packard Company of Palo Alto, California. Each decade of synthesizer 21 has ten input leads corresponding to the ten unit positions in one decade. Thus, if a signal exists at the fifth unit position of the $10^3$ decade, the output frequency of the synthesizer at line 25 will be 5 kilocycles per second (kc.p.s.).

The sweep generator of FIG. 2 is similar to that of FIG. 1. Illustratively, the circuit as shown generates an exponential signal output at line 25. Switch 18 of FIG. 1 has been omitted for the sake of clarity. Decade counters 22 correspond to the decade units of counter 12 (FIG. 1) while divider network 13 is represented by network 26. In addition, a series of logic networks 24 and signal transfer networks 23 are used for restricting the rate of change of control signals, e.g., on bus 44, below a specified numerical quantity. Also shown is a solenoid 28 and switch 29 used to recycle the sweep output signal automatically.

In a manner similar to that described for FIG. 1, the output frequency of the synthesizer may be increased either linearly or exponentially. Assuming that the synthesizer has an exponential output and has reached an output frequency of 50 megacycles per second (mc.p.s.), and that the divider 26 produces an output pulse for each ten input pulses, the decade counter 22–1 corresponding to the $10^0$ position will be changing its registered count at a rate 5 mc.p.s. The frequency synthesizer is required to change its output frequency at this same rate. This rate of change of frequency is much too high for available synthesizers which are limited to a one kc.p.s. rate of change. If the frequency synthesizer were to be used without any modifications the output frequency would be restricted by this limitation. This limitation is overcome by the present invention and, at the same time the rate of change of the synthesizer is restricted to a conservative rate of 100 c.p.s.

To understand how this is accomplished, assume that decade counter 22–2 is set to a count of 50 and all other counters are set to zero so that an output signal with a frequency of 50 c.p.s. appears at the synthesizer output on line 25. After ten cycles of this signal, divider 26, energized with the signal on line 25 via the closed contact of switch 29, pulses counter 22–1 which therefore increases its registered count by one unit resulting in an output frequency of 51 c.p.s. When counter 22–1 has reached a count of nine, the next input pulse advances the counter to zero, the next position in a decade counter, and causes a carry pulse to be transmitted by line 38 to counter 22–2. In a well-known fashion the counters continue to register the number of pulses received until the number 999 has been reached. At this point, counter 22–1 is pulsed at a rate of 99.9 c.p.s., bordering on the assumed 100 c.p.s. limitation. The next input pulse causes a one to appear in the $10^3$ decade, counter 22–4, corresponding to one kc.p.s. When this occurs a pulse from counter 22–4 is transmitted by line 49 to transfer network 23–1, e.g., a multivibrator, which is energized and transmits a change in D.C. level via line 34 to logic network 24–1. This level change inhibits the network, therefore eliminating control of the synthesizer by counter 22–1.

Figure 3:
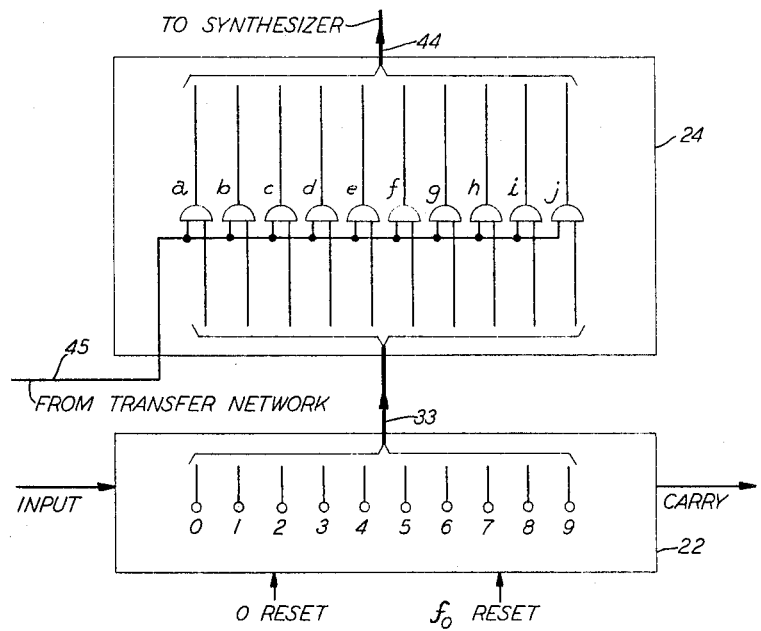
FIG. 3 is a schematic diagram of a control unit of FIG. 2.

The logic network, as more clearly shown in FIG. 3, has a gate circuit in each of the unit lines of a decade. When a D.C. level change is transmitted by a transfer network to a logic network, these gate circuits are inhibited thus effectually preventing the decade counter associated with the network from determining the synthesizer output frequency. With logic network 24–1 inhibited, the synthesizer output frequency thereafter changes in steps of ten c.p.s. instead of one c.p.s. starting at a ten c.p.s. rate of change.

Essentially, what has been done is that the divider has been increased by a factor of ten while at the same time the amount that the synthesizer changes with each pulse has been increased by a factor of ten. Using the terminology of Equation 2, the ratio $K/N$ has remained constant, by increasing numerator and denominator by the same factor, thus preserving the exponential sweep rate. In a like manner when the output frequency of the synthesizer has reached ten kc.p.s., network 23–2 will be energized thus inhibiting the gate circuits of logic network 24–2. The same procedure continues until logic network 24–5 has been inhibited upon the output frequency reaching ten mc.p.s. Inhibition of the remaining decades is unnecessary since the rate of change of signals at the respective counters is below the assumed 100 c.p.s. limitation. Thus, by the utilization of the transfer and logic circuitry of the invention, the output frequency of the synthesizer has been increased far beyond the limitations imposed by the low allowable rate of change of its input signal.

Though the preceding illustration was based on an exponential sweep output, the circuitry of FIG. 2 may be used for the generation of a linear sweep. This mode of operation is achieved by the removal of feedback via line 30 and the substitution of a fixed oscillator at the input of switch 29. It is unnecessary to inhibit the logic networks in this mode since the rate of change of input signals is determined by the frequency of the fixed oscillator in conjunction with the divider. This is accomplished, simply, by inserting switches in the input lines, e.g., line 49 of the transfer networks.

It is, of course, possible to operate the sweep generator of this invention manually by the insertion of a switch in the feedback line 30. Thus, whenever the switch is closed the sweep is initiated and terminates only upon the opening of the switch or upon reaching the upper frequency limit of the synthesizer. As a feature of this invention, however, provision is made for the generation of a recurring sweep with arbitrarily selected upper and lower limits. For example, lines 39 and 40 are connected, for this mode of operation, to the synthesizer input terminals corresponding to an output frequency of 49 mc.p.s. When the synthesizer has reached this frequency, lines 39 and 40 are energized, activating AND circuit 27, which causes a pulse, amplified by amplifier 31, to appear across solenoid 28. The energized solenoid opens switch 29 thus removing the source of input pulses to divided 26. The pulse appearing at the output of amplifier 31 is also transmitted to delay network 41 which, after a delay sufficient to allow the solenoid to operate, energizes reset line 42. If, from the many choices available, divider 26 is selected to be a decimal counter, the pulse on the reset line is used to reset this divider to its initial state. The reset pulse is also transmitted to all the decade counters 22 resetting them to zero. The lower limit $f_0$ of the sweep generator is arbitrarily selected. After a delay of a few microseconds following the zero reset, provided by network 43, a pulse is transmitted to the counter or counters which represent this lower limit. This same pulse is also used to reset the transfer networks to their original state. Meanwhile, the pulse appearing across the solenoid 28 disappears since lines 39 and 40 are no longer energized, and switch 29 closes, starting the sweep. All this is accomplished in approximately a millisecond as compared to a total sweep time measured in minutes. The delay networks used may be of any well-known type. A monostable multivibrator, for example, may serve the purpose.

FIG. 3 shows a detailed diagram of one of the logic networks 24 of FIG. 2. Also shown is a block diagram of a decade counter 22, used in the practice of this invention, coupled by bus 33 to network 24. Counter 22 has ten output lines, contained in bus 33, corresponding to each unit position in a decade. As the counter is pulsed, signals appear on the various unit lines and are transmitted by the bus to logic network 24. Logic network 24 contains a gate circuit, $a, b, \ldots$, for each of these unit lines. Signals leaving the gate circuits are conveyed by bus 44 to the synthesizer, which changes its frequency in accordance with the signals existing on the lines of bus 44. When a level change appears on line 45 from a transfer network the gate circuits are inhibited thus effectually preventing the counter from directly controlling the output frequency of the synthesizer.

Reset inputs to the counter are also shown in FIG. 3. The "0" reset, derived from AND circuit 27 (FIG. 2), returns the counter to its zero state while the $f_0$ reset, which follows the 0 reset by the delay interval of network 43 (FIG. 2), sets the counter to an initial number corresponding to the arbitrarily selected lower limit of the frequency sweep. Decade counters of this type are well known and are adequately described in Pulse and Digital Circuits, Chapter 11, by Millman & Taub, McGraw-Hill Book Company, 1956.

It is to be understood that the embodiments shown and described herein are illustrative and that further modifications of this invention may be implemented by those skilled in the art without departing from the scope and spirit of the invention. For example, manual control may be substituted for the automatic control as described in this invention. The use of a divider is wholly dependent on the frequency range involved and may be altered or deleted under the proper circumstances. In addition, when called for, the circuitry may be modified to count on a scale different from the illustrative decimal scale.

What is claimed is:
1. A signal generator comprising
   a frequency synthesizer having a plurality of selectively controllable signal sources of diverse frequencies and signal output means,
   an auxiliary source of signal oscillations,
   switching means for selecting energizing signals from either said auxiliary source or from said output means,
   first means responsive to selected energizing signals for developing pulses integrally related to the frequency of said energizing signals,
   second means responsive to said developed pulses for producing electrical indications whose rate of change is proportionate to the frequency of said pulses,
   and third means responsive to said electrical indications for selectively controlling said plurality of signal sources whereby a sweep frequency signal is generated at said output means.

2. A signal generator comprising
   a frequency synthesizer having a plurality of selectively controllable signal sources of diverse frequencies and signal output means,
   an auxiliary source of signal oscillations,
   divider means,
   switching means for conveying signals from either said auxiliary source or from said output means to said divider means,
   counter means connected to said divider means for producing electrical indications whose rate of change is proportionate to output signals of said divider means,
   and means connecting said counter means to said input means for selectively controlling said plurality of signal sources whereby a sweep frequency signal is generated by said frequency synthesizer responsive to said electrical indications.

3. A sweep frequency generator comprising
   a source of signals,
   frequency dividing means connected to said source,
   counter means connected to said dividing means for developing electrical indications indicative of a specified numerical quantity,
   and frequency synthesizing means having a plurality of selectively controllable signal sources of diverse frequencies responsive to said indications for producing output signals of a frequency related to said numerical quantity.

4. A sweep frequency generator comprising
   a source of signals of constant frequency,
   means responsive to said signal source for developing signals of a lower frequency than said constant frequency,
   counter means responsive to said lower frequency signals for developing electrical indications indicative of a specified numerical quantity,
   and frequency synthesizing means having a plurality of selectively controllable signal sources of diverse frequencies responsive to said indications for producing output signals of a frequency related to said numerical quantity.

5. A sweep frequency generator comprising
   a plurality of selectively controllable signal sources for producing signals of diverse frequencies,
   a source of signals of fixed frequency,
   means responsive to said source of signals of fixed frequency for developing signals subharmonically related to said fixed frequency,
   and decade counter means responsive to said subharmonic signals for producing electrical indications related to the signals of said source,
   wherein said plurality of signal sources are responsive to said indications with output signal frequencies which are a linear function of time.

6. An electric wave generator whose output signal frequency varies exponentially as a function of time comprising output means for utilizing an applied signal,
decade counter means in circuit relation with said output means for producing electrical indications whose rate of change is proportionate to the frequency of said applied signal,
frequency synthesizing means having a plurality of selectively actuated sources of signals of diverse frequencies responsive to said electrical indications for generating a signal whose rate of change of frequency is related to said rate of change of electrical indications,
and means for applying said generated signal to said output means.

7. A signal generator comprising
frequency synthesizing means including a plurality of selectively actuated signal sources of diverse frequencies and signal output means,
means responsive to said signal output means for developing electrical indications whose rate of change is proportionate to the frequency of the signal appearing at said output means,
and control means responsive to said indications for selectively actuating said plurality of signal sources, whereby a signal is generated at said output means whose frequency is an exponential function of time.

8. A signal generator according to claim 7 wherein said control means comprises a logic network and signal transfer means for restricting the rate of change of said indications below a specified numerical quantity while maintaining said proportionality.

9. A sweep frequency generator comprising
signal frequency developing means including a plurality of controllable signal sources of diverse frequencies and having input means and signal frequency output means,
first means for generating electrical indications representative of a specified numerical quantity in response to applied energization,
second means in circuit relation with said output means for energizing said first means,
and control means in circuit relation with said input means for altering the composite signal frequency developed by said plurality of signal sources exponentially as a function of time in response to said electrical indications.

10. A sweep frequency generator according to claim 9 wherein said control means comprises means for restricting the rate of change of said exponential sweep below a specified numerical quantity.

11. A sweep frequency generator according to claim 10 wherein said second means comprises control means for recycling the sweep signal of said generator.

12. A sweep frequency generator comprising
signal frequency developing means including a plurality of controllable signal sources of diverse frequencies and having input means and output means,
a counter,
means for connecting said output means to said counter,
and programmed means connecting said counter to said input means for controlling said plurality of signal sources whereby said signal frequency developing means generates sweep signals of a frequency exponentially a function of time.

13. A sweep frequency generator according to claim 12 wherein said programmed means comprises means for restricting the rate of change of said exponential sweep below a specified numerical quantity.

14. A sweep frequency generator comprising
counter means for developing electrical control indications related to a numerical quantity registered by said counter means,
a plurality of signals of diverse frequencies, means connected to said counter means and responsive to said control indications for developing from said plurality of signals output signals of a frequency proportionate to said numerical quantity,
and means for utilizing said output signals to energize said counter means thereby generating output signals whose frequencies are an exponential function of time.

15. A signal generator comprising
frequency synthesizing means including a plurality of selectively actuated signal sources of diverse frequencies and having input means and signal frequency output means,
counter means connected to said output means for developing electrical indications whose rate of change is proportionate to the signal frequency appearing at said output means,
and means connecting said counter means to said input means for actuating said plurality of signal sources whereby said frequency synthesizing means responds to said indications with a signal whose frequency is an exponential function of time.

16. A signal generator according to claim 15 wherein said controlling means comprises means including a plurality of logic networks and a plurality of transfer networks in circuit relation with said logic networks for restricting the rate of change of said indications below a specified numerical quantity while maintaining said proportionality a constant.

17. A signal generator according to claim 15 wherein said output means comprises means responsive to said electrical indications for recycling said exponentially related signal frequencies.

References Cited by the Examiner
UNITED STATES PATENTS

| | | | |
|---|---|---|---|
| 2,894,133 | 7/1959 | Bolie | 328—14 X |
| 2,914,733 | 11/1959 | Robuck et al. | 331—51 X |
| 2,928,046 | 3/1960 | Hansel | 324—77 X |
| 3,147,442 | 9/1964 | Fritzsche et al. | 331—51 X |

ARTHUR GAUSS, *Primary Examiner.*

J. S. HEYMAN, *Assistant Examiner.*